United States Patent
Van Den Nieuwelaar et al.

(10) Patent No.: US 8,585,473 B2
(45) Date of Patent: Nov. 19, 2013

(54) SYSTEM AND METHOD FOR CLEANING A CARCASS OR CARCASS PART OF SLAUGHTERED POULTRY

(75) Inventors: Adrianus Josephes Van Den Nieuwelaar, Gemert (NL); Maurice Eduardus Theodorus Van Esbroeck, Bemmel (NL); Albertus Theodorus Johannes Joseph Cornelissen, Cuijk (NL)

(73) Assignee: Marel Stork Poultry Processing B.V., Boxmeer (NL)

( * ) Notice: Subject to any disclaimer, the term of this patent is extended or adjusted under 35 U.S.C. 154(b) by 597 days.

(21) Appl. No.: 12/989,963

(22) PCT Filed: Apr. 27, 2009

(86) PCT No.: PCT/NL2009/000105
§ 371 (c)(1),
(2), (4) Date: Nov. 23, 2010

(87) PCT Pub. No.: WO2009/134123
PCT Pub. Date: Nov. 5, 2009

(65) Prior Publication Data
US 2011/0059684 A1 Mar. 10, 2011

(30) Foreign Application Priority Data

Apr. 29, 2008 (NL) ...................................... 2001534

(51) Int. Cl.
*A22B 5/16* (2006.01)
(52) U.S. Cl.
USPC ........................................................ 452/127
(58) Field of Classification Search
USPC .......... 452/136, 149–153, 155, 156, 166, 167
See application file for complete search history.

(56) References Cited

U.S. PATENT DOCUMENTS

| 4,574,427 | A | 3/1986 | Harben, Jr. et al. |
| 7,344,437 | B2 * | 3/2008 | Van Den Nieuwelaar et al. ............................. 452/187 |

(Continued)

FOREIGN PATENT DOCUMENTS

| EP | 0 244 887 A1 | 11/1987 |
| EP | 0 361 576 A1 | 4/1990 |

(Continued)

*Primary Examiner* — Richard Price, Jr.
(74) *Attorney, Agent, or Firm* — Birch, Stewart, Kolasch & Birch, LLP

(57) ABSTRACT

The invention relates to a system for cleaning a carcass part of slaughtered poultry, which carcass part at least still comprises a part of the breast fillet and skin, which skin comprises at least a part of the breast skin, neck skin and skin in the region of transition between the breast skin and neck skin, wherein the breast skin and the skin in the region of transition between the breast skin and neck skin rest at least partly against the muscular tissue of the breast fillet, from which carcass part the muscular tissue of the neck and the neck vertebrae are substantially removed, which system comprises a neck skin removing device which comprises:
- a gripper for engaging a part of the neck skin that is connected to the rest of the carcass or carcass part,
- a stretching station, which stretching station is configured to exert a force on the neck skin engaged by the gripper in such a way that the skin in the region of transition between the breast skin and neck skin is stretched and becomes detached from the muscular tissue of the breast fillet,
- a blade which is adapted to cut into or to cut through the stretched skin in the region of transition between the breast skin and neck skin while the neck skin in the stretching station is subjected to the force.

36 Claims, 15 Drawing Sheets

(56) References Cited

U.S. PATENT DOCUMENTS

| | | | |
|---|---|---|---|
| 7,614,941 B2 * | 11/2009 | van den Nieuwelaar et al. | 452/185 |
| 8,246,429 B2 * | 8/2012 | Hilgren et al. | 452/173 |
| 8,360,832 B2 * | 1/2013 | Janssen et al. | 452/136 |
| 8,388,421 B2 * | 3/2013 | Janssen et al. | 452/136 |

FOREIGN PATENT DOCUMENTS

| | | |
|---|---|---|
| EP | 1 430 780 A1 | 6/2004 |
| WO | WO 86/06587 A1 | 11/1986 |

\* cited by examiner

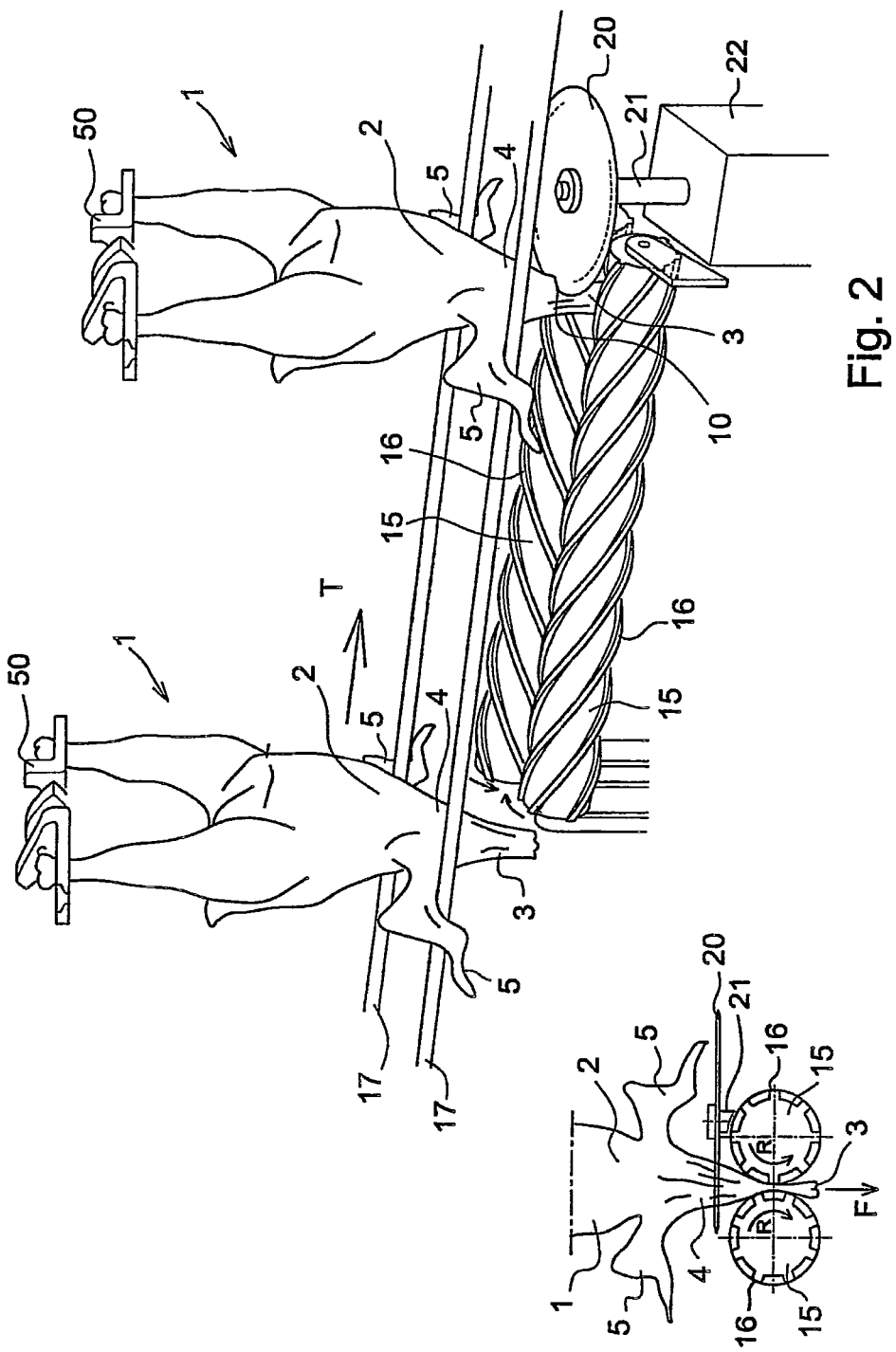

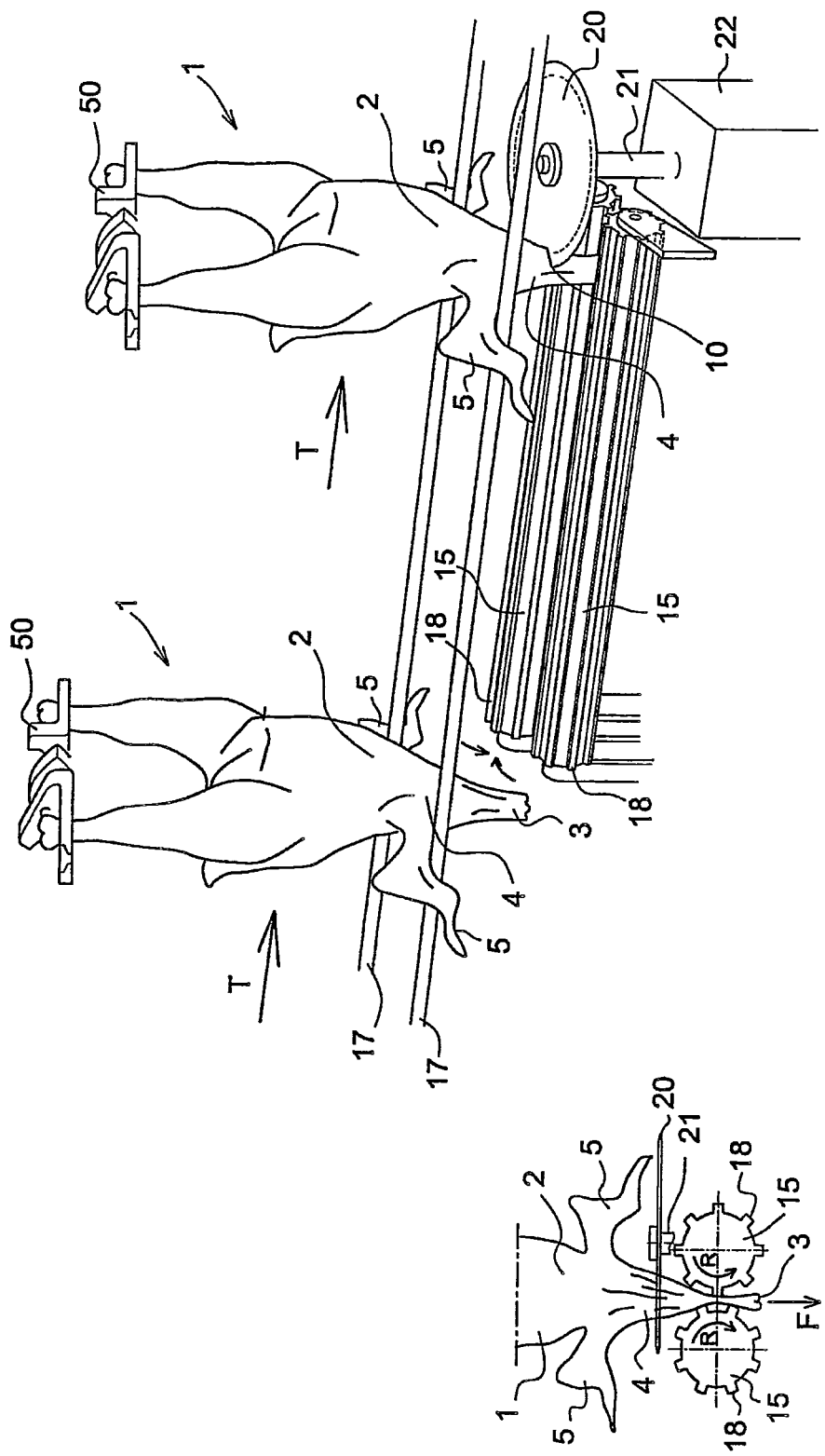

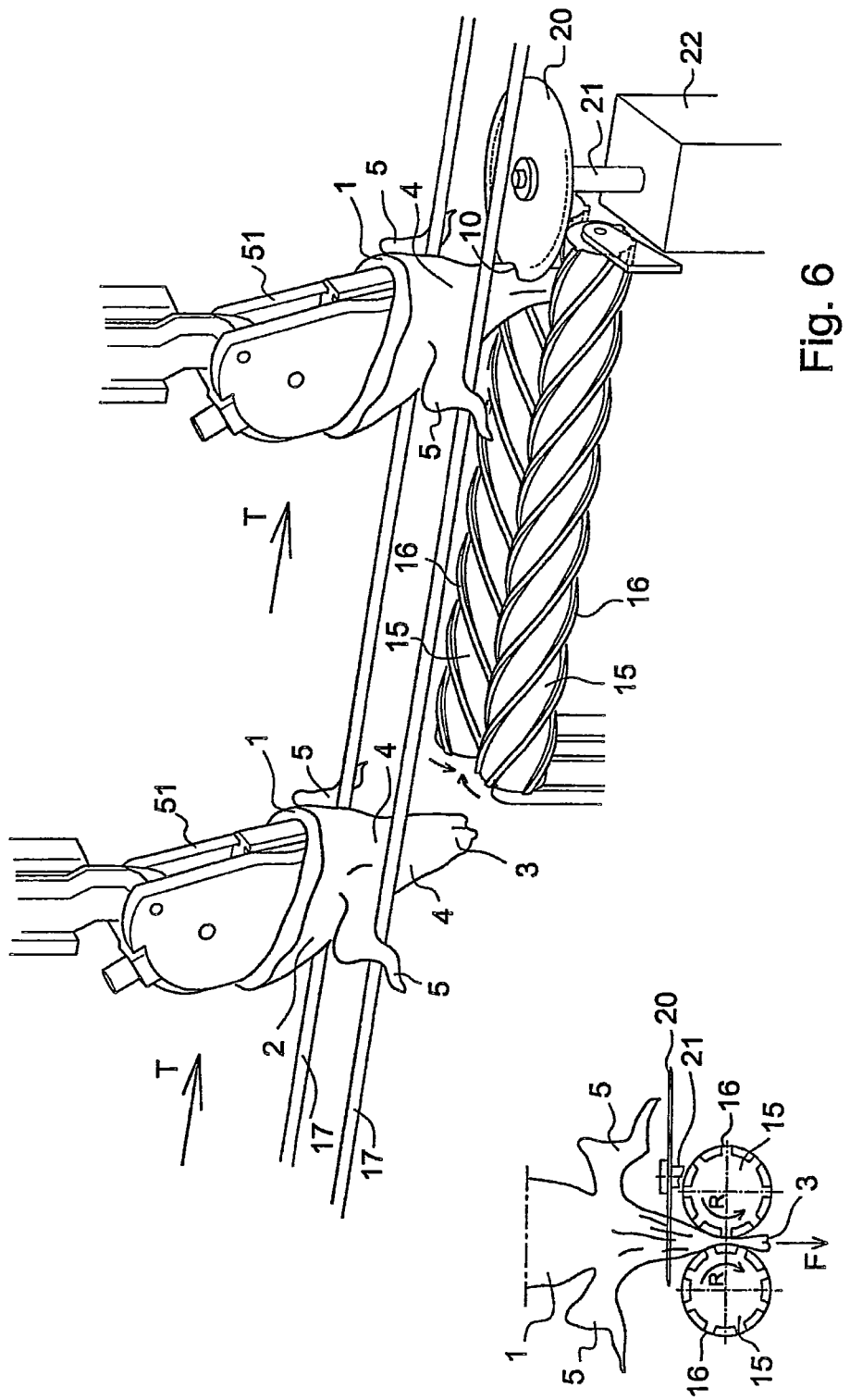

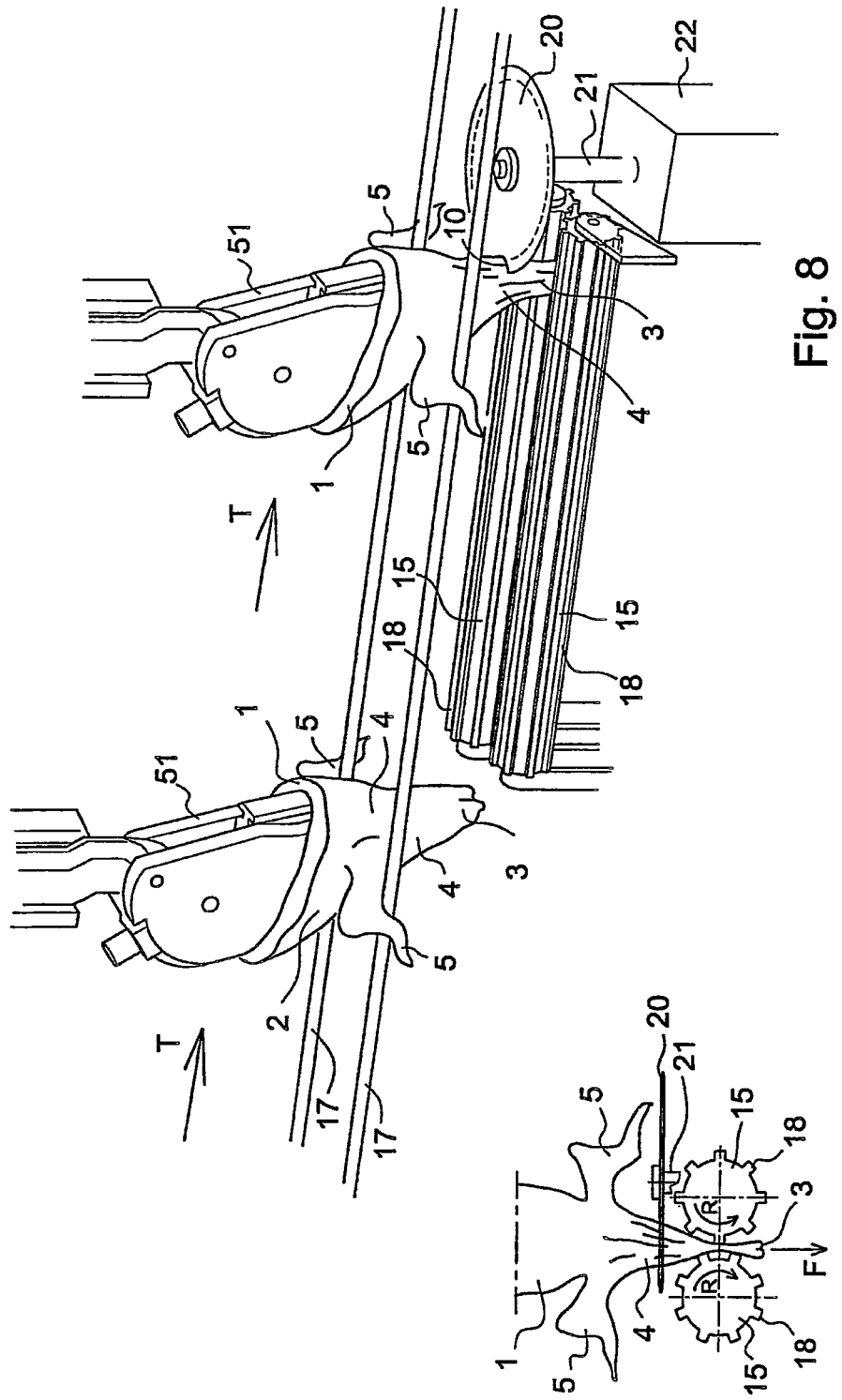

SYSTEM AND METHOD FOR CLEANING A CARCASS OR CARCASS PART OF SLAUGHTERED POULTRY

The invention relates to a system and method for cleaning a carcass or carcass part of slaughtered poultry.

The removing of skin from carcasses or carcass parts of slaughtered poultry is for example known from EP 0244887 which describes that the skin to be removed (in this case the breast skin) is first stretched. Afterwards, an incision is made in the stretched-tight skin, after which the skin is drawn loose from the underlying breast fillet by means of rolls which are provided with a profile.

The removed skin has a commercial value. However, the price paid therefor is highly dependent on the quality. The degree of soiling plays a part in this: the cleaner the breast skin, the higher the quality and thus the price.

Before the breast skin is removed, the carcass or carcass part has already undergone a number of processes. During one of said processes, the internal tissue of the neck (such as for example the muscular tissue, the neck vertebrae, a part of the windpipe and a part of the oesophagus) is removed at least for the most part. However, during this processing, a part of the neck skin in many cases remains connected to the carcass or carcass part, although "empty". In practice, this still connected, substantially "empty" neck skin has in many cases been found to be more markedly soiled than the breast skin. The neck skin is relatively often soiled with for example crop remnants, bone remnants or blood.

During the harvesting of the breast skin, which usually does not take place until relatively late in the overall process of processing the slaughtered poultry, the connected neck skin often comes along with the harvested breast skin. However, the soiling of the neck skin leads to deterioration of the general quality of the harvested skin. For the buyers of the breast skin, such soiling of the harvested skin is more and more often unacceptable.

The object of the invention is to provide an improved system and an improved method for cleaning a carcass or carcass part of slaughtered poultry. A carcass or carcass part can for example be a front half, a breast cap or slaughtered and subsequently dressed poultry.

The object of the invention is achieved by the system according to claim 1 and the method according to claim 27.

In the carcasses or carcass parts to be processed using the system and the method according to the invention, the breast skin which is present and at least a part of the skin in the region of transition between the breast skin and neck skin rest at least partly against the muscular tissue of the breast fillet. The internal tissue of the neck, in particular the muscular tissue and the neck vertebrae, is removed at least for the most part, so that the substantially empty neck skin hangs free from the remainder of the carcass or carcass part. The removal of the muscular tissue from the neck and the neck vertebrae takes place prior to the dressing of the slaughtered poultry, while the removal of the neck skin according to the invention takes place after the removal of the muscular tissue from the neck and the neck vertebrae, and preferably also after the dressing of the slaughtered poultry.

In an advantageous embodiment, the carcass or carcass part to be processed hangs from a product carrier with the neck side down, so that the empty, slack neck skin hangs freely downward. This can easily be achieved by product carriers which are arranged below an overhead conveyor path. In some cases, the empty neck skin will initially stick to a side or to the breast or back of the carcass or carcass part. Therefore, the system comprises in an advantageous embodiment a neck skin stretching device which engages the empty neck skin when that is stuck to the side edge of the carcass or carcass part, and subsequently brings the neck skin into a position hanging freely downward. The neck skin stretching device comprises for this purpose, for example, rolls or scrapers which loosen the neck skin by rubbing or scraping the carcass or carcass part.

A gripper engages the neck skin, after which in a stretching station a force, for example a tensile force, is exerted on the neck skin. This force tensions the skin, but the force which is exerted is not sufficient to tear the neck skin loose from the carcass or carcass part to be processed. The force which is exerted on the neck skin is so great that the skin of the region of transition between the neck skin and breast skin is stretched and is detached from the underlying muscular tissue.

During processing of a carcass or carcass part, the neck of which is directed downward, the neck skin can be pulled further downward, for example in the vertical direction. Preferably, the region of transition between the breast skin and neck skin is then pulled so far downward that it comes to lie lower than the muscular tissue of the breast fillet.

Subsequently, an incision is made in the skin of the region of transition between the breast skin and neck skin. This incision can pass right through the skin or cut into the skin in such a way that the neck skin is torn loose from the breast skin as a result of the tension which the tensile force causes in the breast skin. When the neck skin and the breast skin are separated from each other, the tensile force acting on the breast skin has of course disappeared.

Preferably, the skin tissue is pulled sufficiently far away from the muscular tissue of the breast fillet that the muscular tissue of the breast fillet remains out of reach of the blade with which the incision is made in the region of transition between the breast skin and neck skin.

As a result of the resilience of the skin tissue, the skin on the breast side of the incision made will to a significant degree return to the position which it assumed before a force was exerted thereon. The muscular tissue of the breast fillet is then again for the most part covered by the breast skin. If the incision is positioned correctly, no or almost no free-hanging skin tissue will remain. The process can be optimized partly by optimizing the amount of force exerted on the neck skin.

If the skin tissue is not tensioned in advance, this effect cannot be attained or can be attained only with great effort. The part of the skin that is, generally speaking, most soiled is thus removed from the carcass or carcass part. The skin which remains can accordingly be harvested separately from this soiled part, as a result of which it yields more money. Furthermore, the breast fillet, with just the skin resting against the muscular tissue, has a more attensile appearance, so that when it is sold as "skin-on breast meat", it can be presented in a manner which the consumer will find more attensile. Also, no or less subsequent trimming of the skin is necessary in order to obtain a presentation which is attensile to the consumer.

A further advantage of the system and the method according to the invention is the fact that it offers the possibility of reducing the risk of damage to the breast fillet during the cutting-loose of the neck skin by the blade which cuts the neck skin loose. This results from the fact that in an advantageous embodiment the blade cuts through or cuts into the neck skin at a certain distance from the muscular tissue of the breast fillet. Otherwise, more soiled skin would remain connected to the carcass part, or the risk of damage to the breast fillet would be high.

The gripper can in principle be any construction which engages the neck skin. It is thus possible to embody the gripper in the form of gripper rolls which are provided with a profile. The profile engages with the neck skin. The rotation of the gripper rolls subsequently causes a tensile force to be exerted on the neck skin. The profile on the gripper rolls can have any suitable form, and thus be for example helical or straight and parallel to the longitudinal axis of the gripper rolls. In another embodiment, the gripper is embodied as a clamp with two jaw parts, between which the neck skin can be clamped. In still another embodiment, the gripper is embodied with one or more skewers which pierce the neck skin or project at least partly into the neck skin.

The invention will be commented on hereinafter in greater detail with reference to the drawing showing in a non-restrictive manner a number of embodiments.

In the drawing:

FIG. 2 shows a first embodiment of the system according to the invention;

FIG. 3 is a front view of the embodiment of FIG. 2;

FIG. 4 shows a variant of the embodiment of FIG. 2 and FIG. 3;

FIG. 5 is a front view of the variant of FIG. 4;

FIG. 6 shows a further variant of the embodiment of FIG. 2 and FIG. 3;

FIG. 7 is a front view of the variant of FIG. 6;

FIG. 8 shows a variant of the embodiment of FIG. 4 and FIG. 5;

FIG. 9 is a front view of the variant of FIG. 8;

Figure 1D:
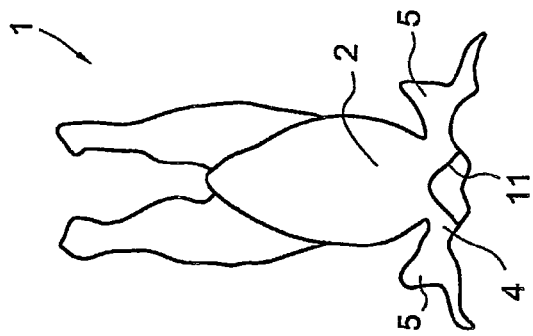
FIG. 1 is an overview of the method according to the invention.
Figure 1C:
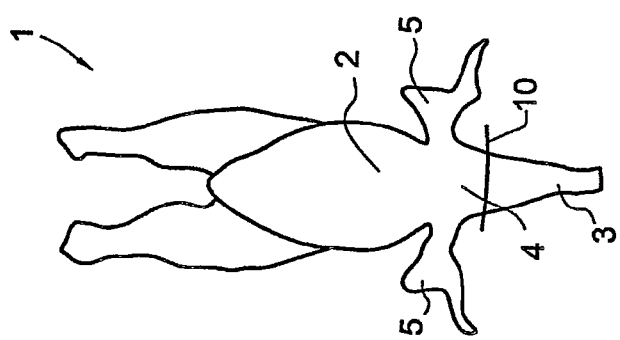
Figure 1B:
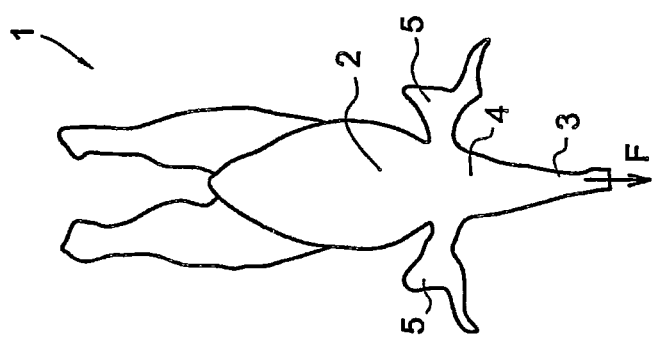
Figure 1A:
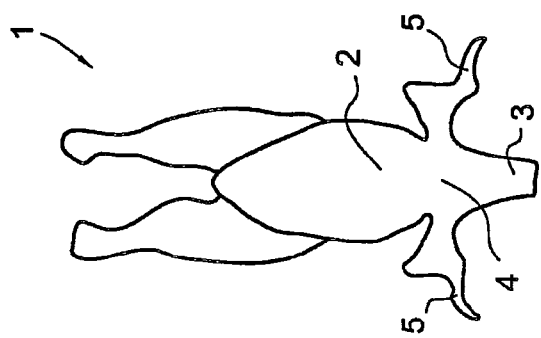

FIG. 1a shows a carcass or carcass part 1 of slaughtered poultry. In this example, the carcass or carcass part is a dressed carcass of slaughtered poultry, still with wings 5, but the invention is also applicable to, for example, front halves and breast caps, with or without wings or parts of wings. The carcass or carcass part 1 comprises breast skin 2, neck skin 3 and skin 4 in the region of transition between the neck skin and breast skin. The internal tissue of the neck, in the form of muscular tissue and neck vertebrae, is substantially removed before the method according to the invention is carried out. It may be the case that remnants of the muscular tissue or other tissue of the neck (such as parts of the oesophagus and/or windpipe) remain, but the neck skin is substantially "empty" and thus slack. Generally, the muscular tissue of the neck and the neck vertebrae will already be removed before dressing by a neck piece removing device. The cleaning of the carcass by removing the neck skin according to the invention preferably takes place after the dressing.

FIG. 1b shows the exerting of a tensile force F on the empty neck skin. As a result, the neck skin, the skin in the region of transition between the neck skin and breast skin and at least a part of the breast skin are stretched out. As a result of the tensile force, the skin 4 in the region of transition between the neck skin and breast skin becomes detached from the muscular tissue of the breast fillet. In this example, the part in question of the skin lies below the breast fillet (viewed in the vertical direction), as shown in FIG. 1b.

FIG. 1c shows an incision 10 which is made in the skin in the region of transition between the neck skin and breast skin. This incision 10 ensures that the breast skin is no longer subjected to the tensile force.

The incision is made by a blade which is moved toward the carcass part, or by a blade which is fixed next to the path along which the carcasses or carcass parts are moved. The relative movement of the carcasses or carcass parts along the path also ensures relative movement with respect to the blade; this can take care of or contribute to the making of the incision.

It is advantageous if the skin tissue in the region of transition between the breast skin and neck skin is pulled sufficiently far away from the breast fillet that the breast fillet remains out of reach of the blade. This prevents damage to the breast fillet and to the meat surrounding the breast fillet. As a result, the breast fillet remains intact and thus commercially valuable.

FIG. 1d shows the situation after the carrying-out of the method according to the invention. The breast skin has—partly as a result of its resilient properties—recoiled and covers most of the breast fillet. The edge 11 of the skin along which the incision 10 is made rests against the muscular tissue of the breast fillet. As a result of the fact that at the moment of cutting the skin which is cut through or cut into does not rest against the breast fillet, there is little risk of damage being caused to the breast fillet by the blade which cuts through or cuts into the skin.

The method according to the invention can be carried out automatically, that is to say, use is made of a system which carries out all the steps of the method or at least some of the steps of the method.

FIG. 2 and FIG. 3 show a first embodiment of a system according to the invention. FIG. 2 is a side view, FIG. 3 shows the system of FIG. 2 viewed counter to the direction of conveyance T. In FIG. 3, a part of the shaft 21 and drive 22 is omitted from the drawing for the sake of clarity.

In this example, the neck skin removing device of the system is provided with two gripper rolls 15 which are each provided with a helical profile 16. The gripper rolls 15 are rotatable about their longitudinal axis; during operation, the gripper rolls 15 rotate counter to each other, as is shown by the arrows R in FIG. 3. Carcasses or carcass parts 1 are arranged in product carriers 50. The product carriers are moved along a path in the direction of conveyance T.

When the free-hanging neck skin 3 of the carcass or carcass part 1 enters the region of the helical profiles 16 of the gripper rolls 15, it is gripped by these profiles. The gripper rolls 15 rotate counter to each other and pull the neck skin 3 downward while the product carrier 50, which carries the carcass or carcass part 1 in question, conveys this carcass or carcass part 1 onward in the direction of conveyance T. The gripper rolls 15 with the profiles 16 exert, as a result of their rotation, a tensile force F in the vertical direction on the neck skin 3. Optionally, an additional tensile force can be generated in the horizontal direction by of the speed of conveyance of the product carrier 50. As a result of the tensile force acting on the neck skin 3, the skin 4 in the region of transition between the neck skin and breast skin and the breast skin 2 are also pulled downward or obliquely downward.

It has been found that the amount of tensile force which is exerted on the neck skin partly defines the results of the processing. It is therefore also advantageous if the tensile force which is exerted on the neck skin by the neck skin removing device is variable and/or adjustable. In the embodiment of FIGS. 2 and 3, the tensile force from the gripper rolls 15 can be influenced by altering the distance between the profiles 16 of the gripper rolls 15, for example by changing the centre-to-centre distance of the gripper rolls 15. It is also possible to change the rigidity of the profile 16 of one or both gripper rolls 15 by means of the material selected for the profile 16 in question. In the event of a desired change of the tensile force, one or both gripper rolls are then exchanged in their entirety. Another possibility is for only the profile to be exchanged. This is possible if the profile 16 is made detachable from the associated gripper roll 15, for example as a result of the gripper roll 15 being provided with a straight or helical slot into which a plastics material or rubber plate can be slid.

Furthermore, it is advantageous if also the direction of the tensile force acting on the neck skin can be adjusted. This can for example be achieved by way of the positioning of the grippers (gripper rolls or another design of the grippers) with respect to the path which the carcasses or carcass parts follow, and/or by creating a difference in speed between the carcasses or carcass parts along the path, on the one hand, and the speed which the grippers impose on the neck skin which they grip, on the other hand.

Preferably, the system is provided with guides 17 which ensure that the carcass or carcass part 1 is not pulled downward by the gripper rolls 15. In this example, the guides 17 support the wings 5. As a result of this support, which could in fact also engage an other part of the carcass or carcass part 1, the tensile force F is effectively used for tugging on the neck skin 3.

A rotating blade 20 is arranged downstream (viewed in the direction of conveyance T) of the gripper rolls 15. The vertical distance of this blade 20 with respect to the product carriers 50 is selected in such a way that the blade 20 makes an incision 10 in the skin 4 in the region of transition between the neck skin and breast skin, which skin 4 is pulled downward with respect to the position which it naturally assumes as a result of the tensile force F which is exerted on the neck skin 3. The blade 20 is attached to the shaft 21 and is driven by the drive 22. The breast fillet of the carcass or carcass part 1 stays out of reach of the blade 20.

Preferably, the vertical distance between the blade 20 and product carriers 50 is adjustable, thus allowing the location of the incision to be optimized.

The blade 20 makes an incision 10, as a result of which the neck skin 3 is separated from the skin 4 out of the region of transition and from the breast skin 2. In this example, the blade 20 cuts through the skin, although the tensile force F exerted by the gripper rollers 15 can make that the neck skin 3 is partly torn loose before the whole incision 10 is made.

FIG. 4 and FIG. 5 show a variant of the embodiment of FIG. 2 and FIG. 3. In the example of FIG. 4 and FIG. 5, the gripper rolls 15 are provided with a rectilinear profile 18. The functioning of this variant is the same as the functioning of the embodiment shown in FIG. 2 and FIG. 3.

FIG. 6 and FIG. 7 show the embodiment of FIG. 2 and FIG. 3, but now with front halves as carcasses or carcass parts 1 to be processed. The product carriers 51 used in the variant of FIG. 6 and FIG. 7 are configured for the carrying of front halves, but can for example also hold breast caps.

FIG. 8 and FIG. 9 show the embodiment of FIG. 4 and FIG. 5, with the rectilinear profiles 18 on the gripper rolls 15, but now with front halves as carcass parts 1 to be processed. The product carriers 51 used in the variant of FIG. 8 and FIG. 9 are configured for the carrying of front halves, but can for example also hold breast caps.

Figure 10:
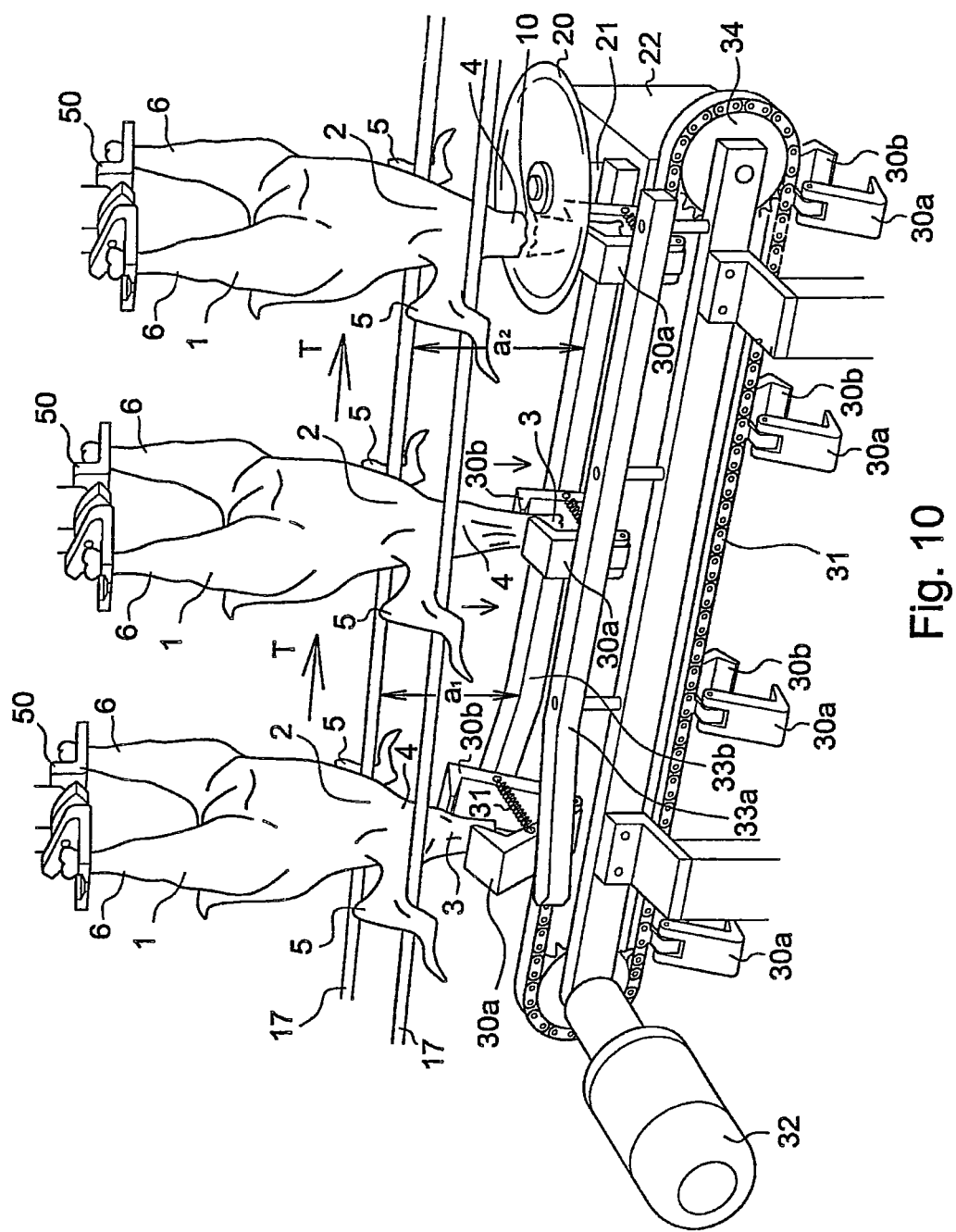
FIG. 10 shows a second embodiment of the system according to the invention.

FIG. 10 shows a second embodiment of the system according to the invention. In the example of FIG. 10, carcasses 1 are processed. The carcasses are dressed carcasses of slaughtered poultry that are carried by product carriers which engage on leg parts 6 of the carcass.

In the embodiment of FIG. 10, the system according to the invention comprises a plurality of grippers 30 which each have two jaw parts 30a, 30b. The jaw parts 30a, 30b are hingeable with respect to each other so that the gripper 30 has an open and a closed position. In this example, a compression spring 31 is attached between the jaw parts 30a, 30b so that the gripper 30 is open when no force is exerted thereon any more. A person skilled in the art will understand that this can be achieved also in other ways, for example using weights.

In the embodiment of FIG. 10, a plurality of grippers 30 are attached to an endless carrier, in this example an endless chain 31. The pitch between successive grippers 30 is equal to the pitch between successive product carriers 50. A person skilled in the art will understand that, instead of the endless chain 31, an endless belt or cord can for example also be used. The chain is driven by motor 32. When the motor 32 drives the chain 31, the grippers 30 are moved along a path. During the movement along this path, the grippers 30 move synchronously with the product carriers 50 for at least part of the time, at the same speed and at the same pitch distance as the product carriers 50. The system according to FIG. 10 also comprises gripper guides 33a, 33b. The gripper guides ensure that the jaw parts 30a, 30b are brought from the open position to the closed position and are held for some time in the closed position when the grippers 30 pass the gripper guides 33a, 33b.

In use, a gripper 30 arrives, during the following of the path imposed by the chain 31, at a given moment below a carcass or carcass part 1 to be processed, in such a way that the free-hanging part of the neck skin 3 comes to hang between the jaw parts 30a, 30b (situation as shown in FIG. 10, with regard to the carcass shown on the left-hand side). The gripper 30 moves at the same speed as the product carrier 50 which holds the carcass or carcass part 1 to be processed. As a result, the neck skin 3 hangs between the jaw parts 30a, 30b.

During the further movement, the gripper arrives between the gripper guides 33a, 33b which move the jaw parts 30a, 30b toward each other in order to close the gripper 30, counter to the functioning of the compression spring 31. When the gripper 30 is closed, it grips the free-hanging part of the neck skin 3 between the jaw parts 30a, 30b.

Although the path of the grippers runs in the same vertical plane as the product carriers 50 with the carcasses or carcass parts 1, the vertical distance a between a gripper 30 and the product carrier 50 located thereabove gradually increases downstream. So, in FIG. 10, the distance a1 is smaller than the distance a2. As a result of the fact that the vertical distance a between the gripper 30 and the product carrier 50 located above the gripper in question increases, the closed gripper 30 exerts a tensile force on the neck skin 3. This is shown in the middle carcass in FIG. 10. The increasing of the distance a can be achieved by making the path of the grippers run downward with respect to the path of the product carriers, by making the path of the product carriers run upward with respect to the path of the grippers or by making both the path of the product carriers run upward and the path of the grippers run downward.

As a result of the tensile force acting on the neck skin 3, the skin 4 in the region of transition between the neck skin and breast skin and the breast skin 2 are also pulled downward. Again, the guides 17 make that the carcass or carcass part 1 is supported and the tensile force is effectively used for displacing the skin 4.

The system further comprises a rotating blade 20. The vertical distance of this blade 20 with respect to the product carriers 50 is selected in such a way that the blade 20 makes an incision 10 in the skin 4 in the region of transition between the neck skin and breast skin, which skin 4 is pulled downward with respect to the position which it naturally assumes as a result of the tensile force which is exerted by the grippers 30 on the neck skin 3. The blade 20 is attached to the shaft 21 and is driven by the drive 22. The breast fillet of the carcass or carcass part 1 remains out of reach of the blade 20.

Preferably, the vertical distance between the blade 20 and product carriers 50 is adjustable, thus allowing the location of the incision to be optimized.

The blade 20 makes an incision 10, as a result of which the neck skin 3 is separated from the skin 4 out of the region of transition and from the breast skin 2. In this example, the blade 20 cuts through the skin, although the tensile force exerted by the gripper 30 can cause the neck skin 3 to be partly torn loose before the whole incision 10 is made.

Once the neck skin 3 has been cut loose from the remainder of the carcass or carcass part 1, the gripper 30 passes the return roll 34. The gripper 30 leaves the region of the gripper guides 33*a*, 33*b*, as a result of which the compression spring 31 hinges the jaw parts 30*a*, 30*b* apart so the gripper 30 opens.

Figure 11:
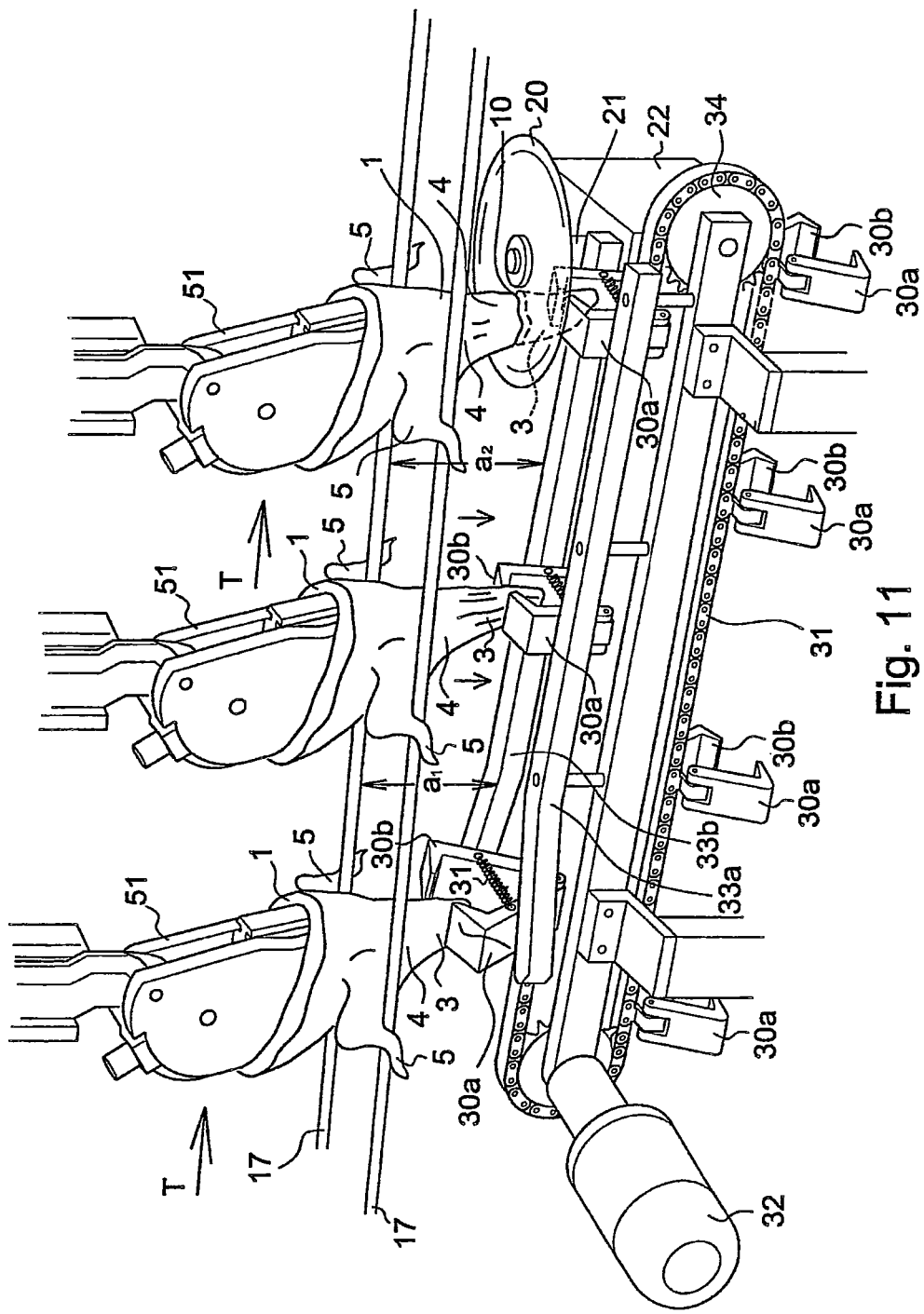
FIG. 11 shows a variant of the embodiment according to FIG. 10.

FIG. 11 shows a variant of the embodiment according to FIG. 10. In the variant of FIG. 11, the system is used with front halves as carcass parts 1 to be processed. The product carriers 51 used in the variant of FIG. 11 are configured for the carrying of front halves, but can also for example hold breast caps. The functioning of the variant of FIG. 11 is furthermore similar to the functioning of the embodiment of FIG. 10.

Figure 12:
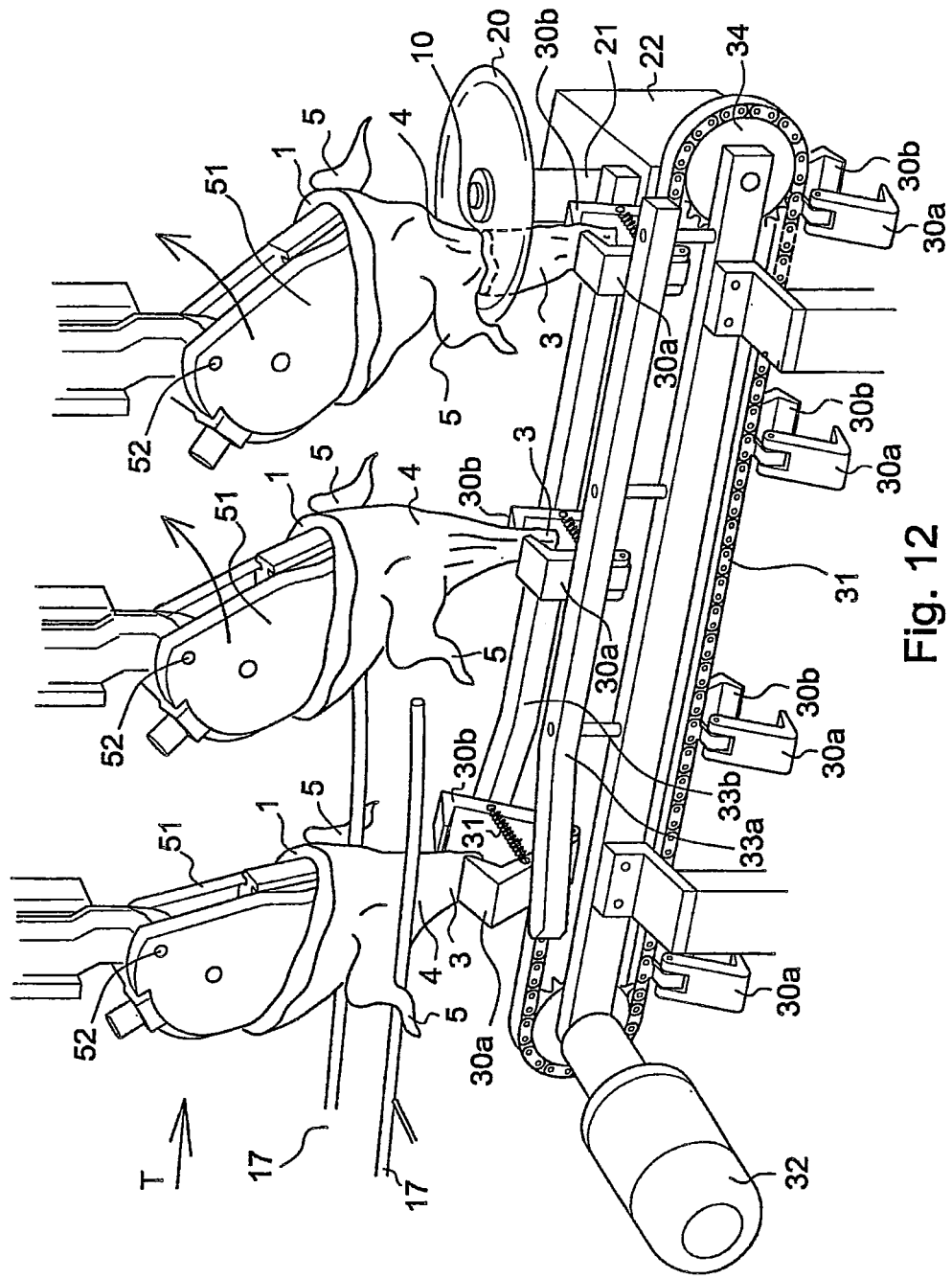
FIG. 12 shows a variant of the embodiment according to FIG. 11.

FIG. 12 shows a further variant of the embodiment of FIG. 11. In this variant, use is made of the possibility of swivelling the product carrier 51 about the axis 52 in order to increase the distance between the product carrier 51 and gripper 30. This manner of increasing the aforementioned distance can be used as an alternative to or in addition to the possibilities indicated in relation to FIG. 10 for increasing the distance between a gripper and the product carrier located above this gripper.

Figure 13:
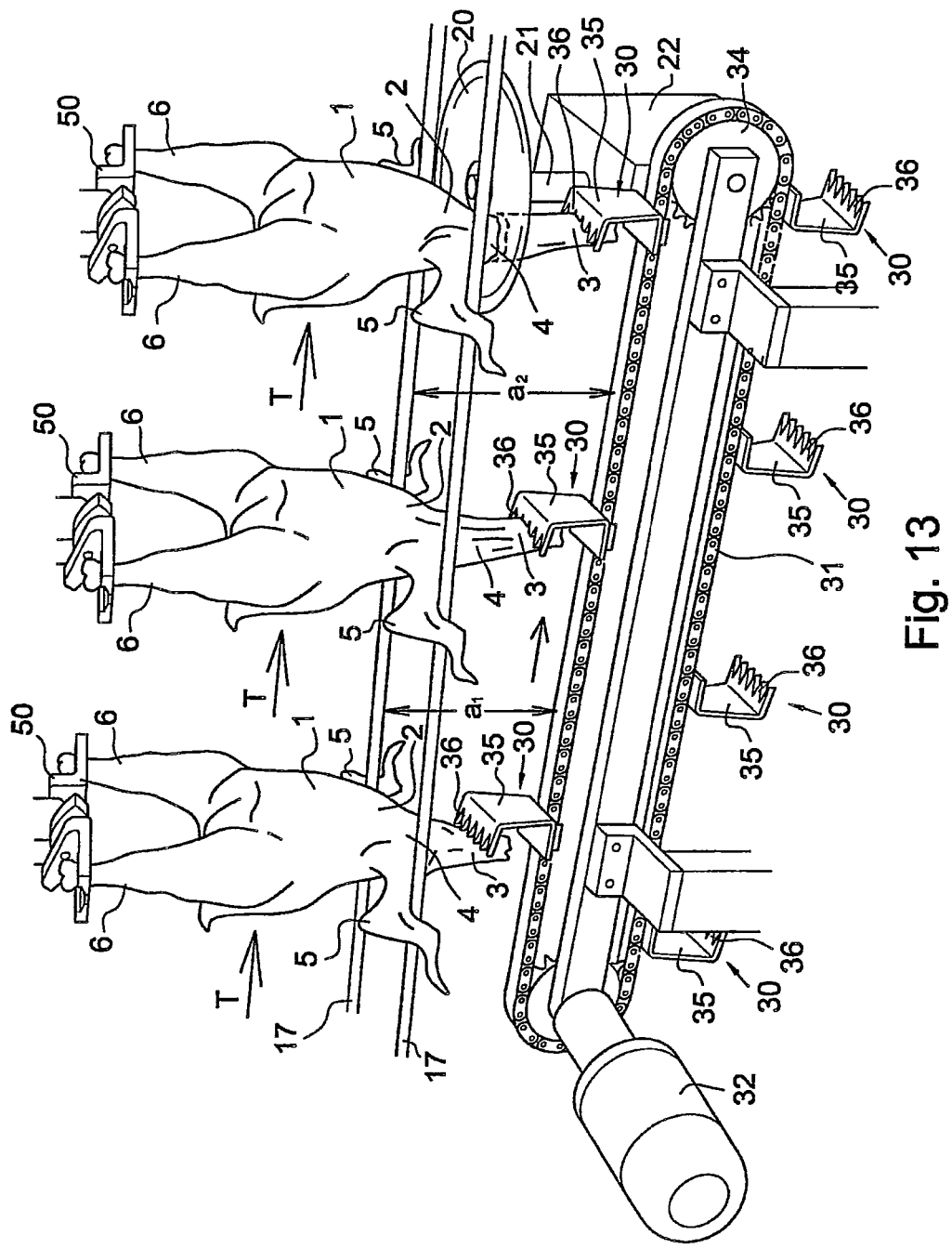
FIG. 13 shows a further variant of the embodiment of FIG. 10.

FIG. 13 shows a further variant of the embodiment of FIG. 10. In the embodiment of FIG. 13, grippers 30 are used, which are provided with a toothed plate 35 having sharp points 36. These sharp points 36 secure the neck skin 3. FIG. 13 shows this variant in combination with product carriers 50 which engage the leg parts 6 of the carcasses or carcass parts 1. It will be clear to a person skilled in the art that this variant can also be used for the processing of front halves or breast caps, wherein use is for example made of the product carriers 51 which have already been shown and are suitable for holding front halves or breast caps. The functioning of the variant of FIG. 13 is furthermore similar to the functioning of the embodiment of FIG. 10.

Figure 14:
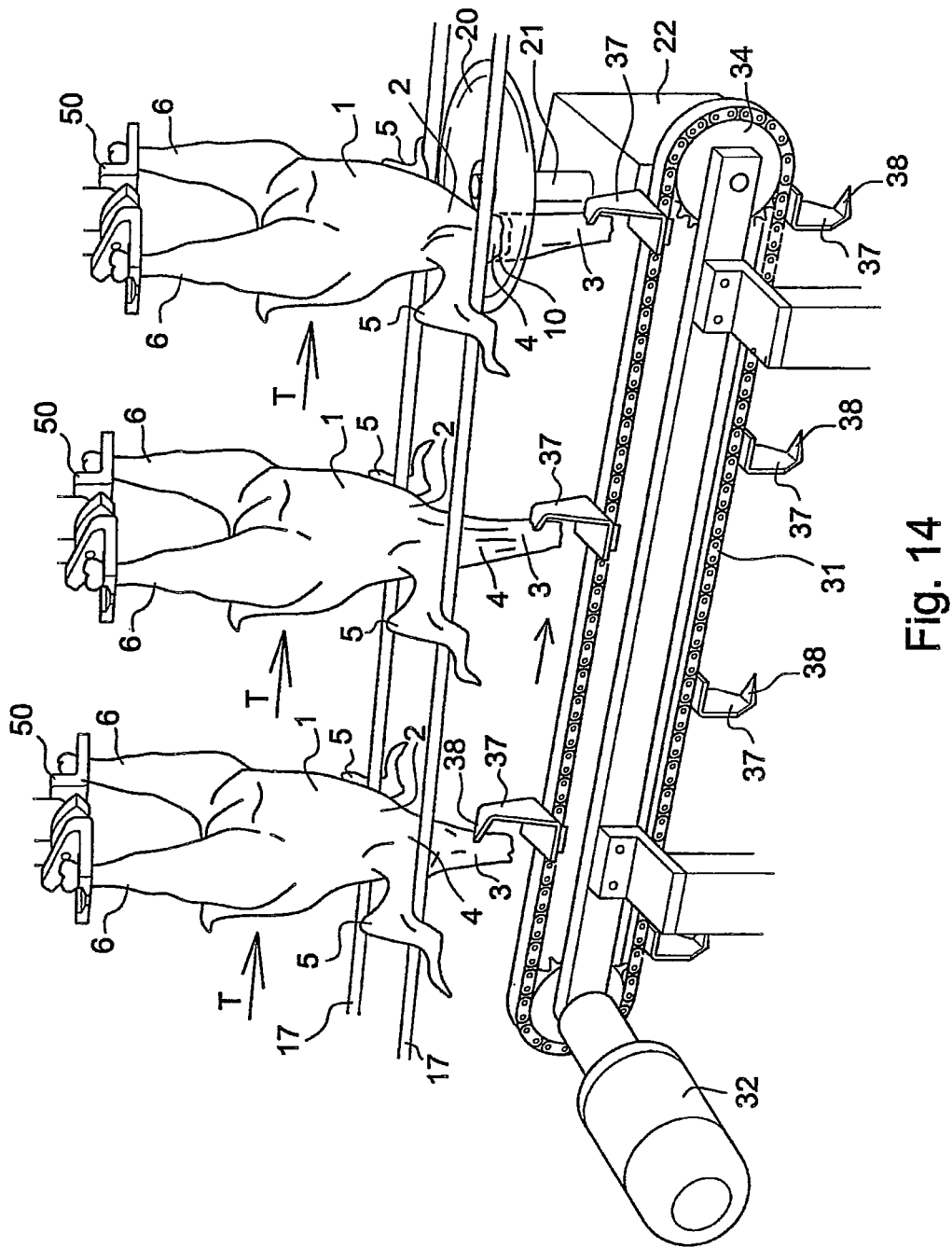
FIG. 14 shows a variant on the embodiment of FIG. 13.

FIG. 14 shows a variant on the embodiment of FIG. 13. In the variant of FIG. 14, grippers 37 are used, which are each provided with a single sharp point 38. The sharp point 38 grips the neck skin 3. FIG. 14 shows this variant in combination with product carriers 50 which engage the leg parts 6 of the carcasses or carcass parts 1. It will be clear to a person skilled in the art that this variant can also be used for the processing of front halves or breast caps, wherein use is for example made of the product carriers 51 which have already been shown and are suitable for holding front halves or breast caps. The functioning of the variant of FIG. 14 is furthermore similar to the functioning of the embodiment of FIG. 13.

Figure 15:
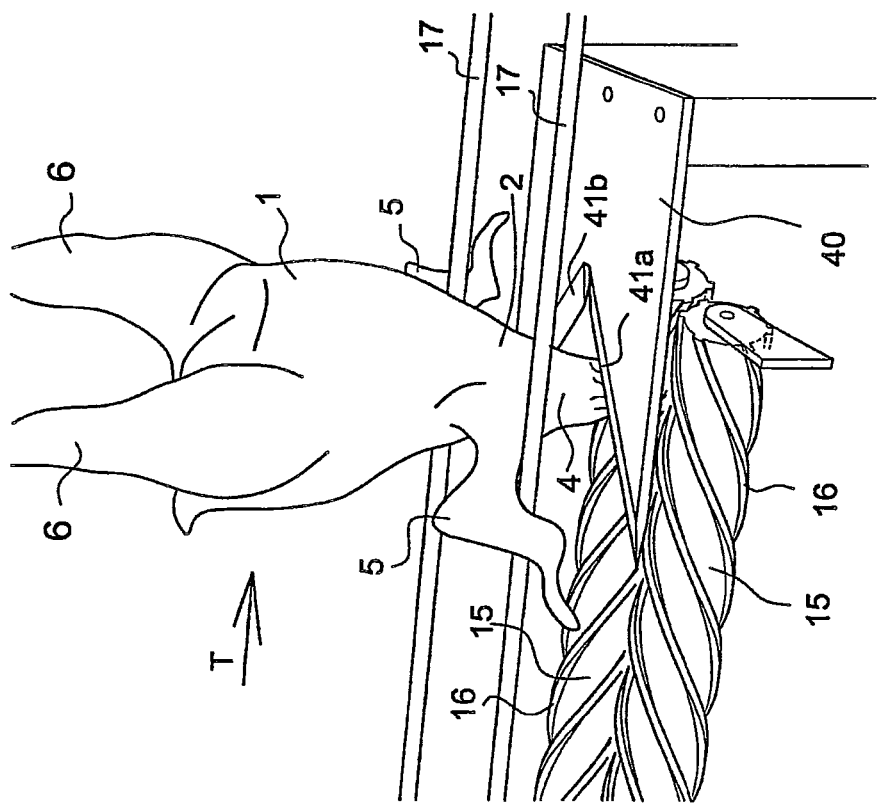
FIG. 15 shows a variant of the embodiments of FIG. 2 and FIG. 6.

FIG. 15 shows a variant of the embodiments of FIG. 2 and FIG. 6. In the variant of FIG. 15, a static blade 40 having cutting edges 41*a*, 41*b* is used instead of the rotating blade 20 on the shaft 21, which rotating blade 20 is driven by the drive 22. Preferably, the cutting edges 41*a*, 41*b* together form a V shape, so that the neck skin 3 cannot easily pass the static blade 40 without being cut into or cut through. The functioning of the variant of FIG. 15 is furthermore similar to the functioning of the embodiments of FIG. 2 and FIG. 6.

Figure 16:
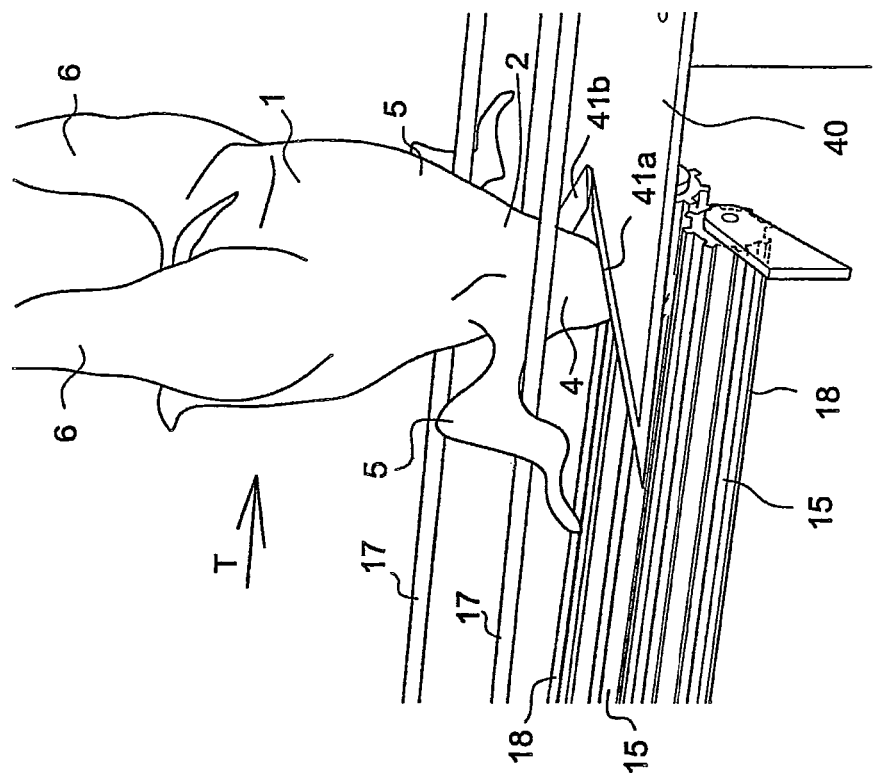
FIG. 16 shows a variant of the embodiments of FIG. 4 and FIG. 8.

FIG. 16 shows a variant of the embodiments of FIG. 4 and FIG. 8. In the variant of FIG. 16, a static blade 40 having cutting edges 41*a*, 41*b* is used instead of the rotating blade 20 on the shaft 21, which rotating blade 20 is driven by the drive 22. Preferably, the cutting edges 41*a*, 41*b* together form a V shape, so that the neck skin 3 cannot easily pass the static blade 40 without being cut into or cut through. The functioning of the variant of FIG. 16 is furthermore similar to the functioning of the embodiments of FIG. 4 and FIG. 8.

It will be clear to a person skilled in the art that also in the other embodiments shown, a static blade 40 can be used instead of a rotating blade 20.

Figure 17B:
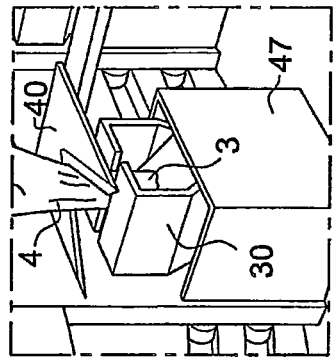
FIG. 17 shows a further variant of the embodiment of FIG. 10.
Figure 17C:
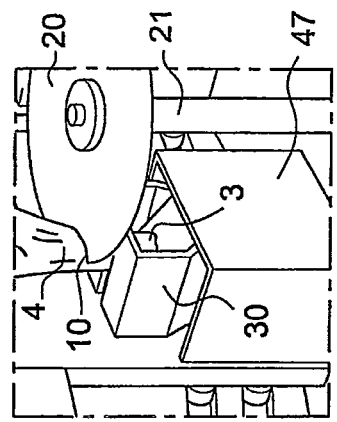
Figure 17A:
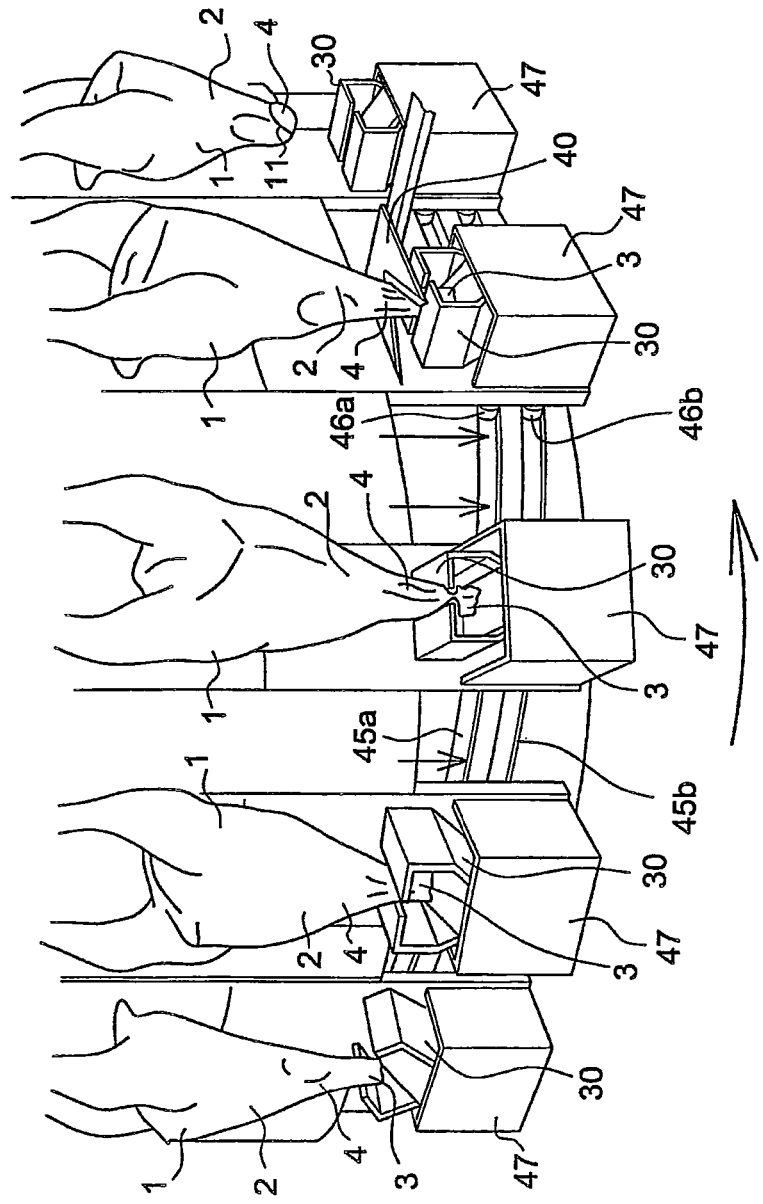

FIG. 17 shows a further variant of the embodiment of FIG. 10. In this embodiment, the method according to the invention is carried out in a carousel machine instead of in a machine with a line layout. The closing of the gripper 30 and the downward movement of the gripper 30 with respect to the carcass or carcass part 1 to be processed are activated in this variant by cam tracks 45*a*, 45*b* with cam rolls 46*a*, 46*b*. As is shown in FIG. 17*a* and FIG. 17*b*, use may be made of a static blade 40 which is arranged at a fixed position (so this blade does not rotate in tandem with the carousel). As an alternative, as FIG. 17*c* shows, use may also be made of a rotating blade 20. The rotating blade 20 is then also arranged at a fixed position, and thus does not rotate with the carousel.

In this variant, the moving parts of the grippers 30 are protected by screens 47. The screens contribute to the safety of persons who are located in proximity to the machine.

Figure 18:
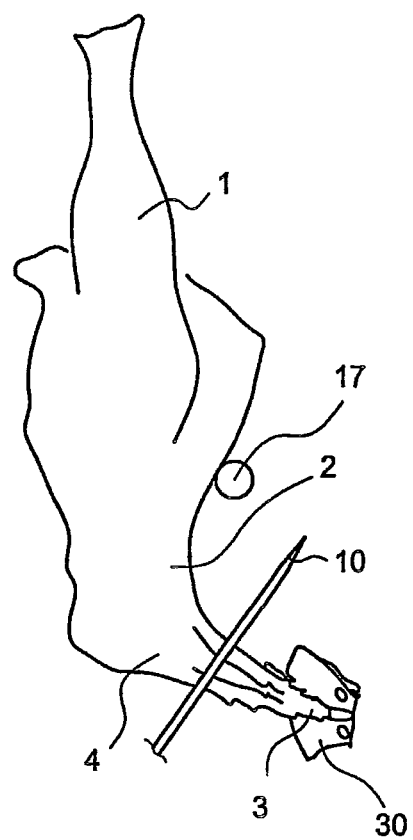
FIG. 18 shows a further variant.

In a further variant, which is shown in FIG. 18, a force is exerted on the neck skin which is positioned at an angle (greater than 0°) to the direction of the breastbone of the carcass or carcass part to be processed.

Figure 19:
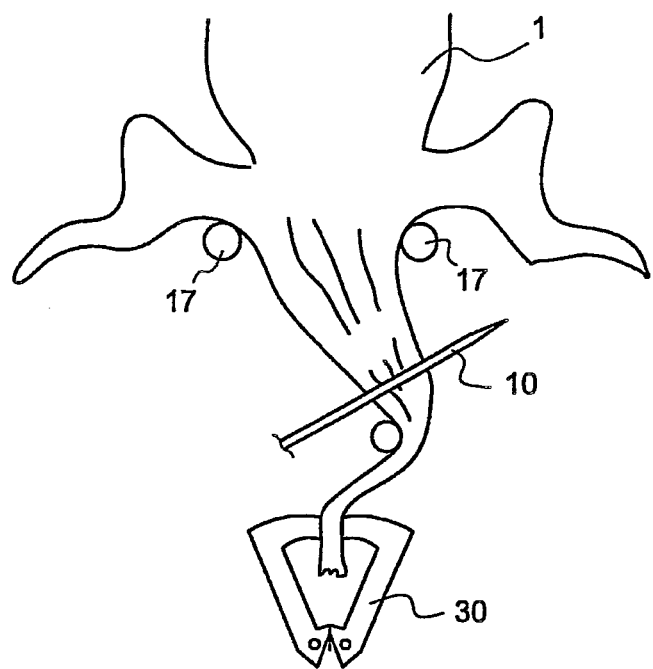
FIG. 19 shows a further embodiment.

In a further embodiment, which is shown in FIG. 19, the force is exerted on the neck skin by a guide which pulls the neck skin to the side. The distance between the gripper and product carrier can then remain constant, although that is not necessary.

It will be clear to a person skilled in the art that also in the variants of FIGS. 18 and 19, the breast fillet remains out of reach of the blade.

Figure 20:
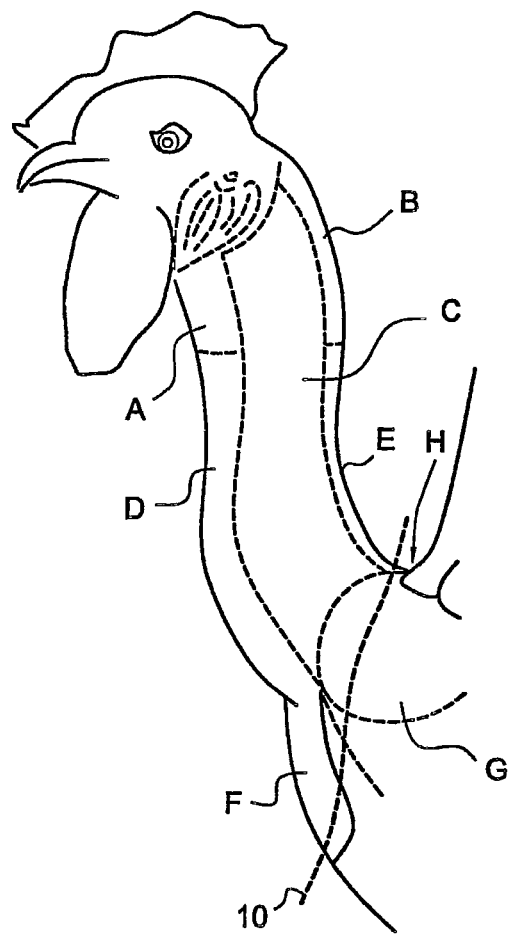
FIG. 20 shows the anatomy of the neck of a chicken.

FIG. 20 shows the anatomy of the neck of a chicken. Various parts may be distinguished therein. Parts A and D (including part F, which is a component of part D) together form the regio colli ventralis. A is in this case the anterior part, D the posterior part. The caudal boundary of the posterior part D of the regio colli ventralis is roughly V-shaped and follows substantially the course of the Pectoralis superficialis muscles over the wishbone (claviculum). The posterior part D also comprises a region F, the crop region.

The neck region further comprises the regio colli lateralis which is denoted in FIG. 20 by the letter C. A region of this type is located on both sides of the neck.

The regio colli dorsalis is located on the side of the back. The regio colli dorsalis is denoted in FIG. 20 by the letters B, E and H. The letter B denotes in this case the dorsum anterius colli, the letter E the dorsum posterius colli and the letter H the regio interscapularis. The regio interscapularis H is the part between the shoulder blades. The shoulder region itself is denoted in FIG. 20 by the letter G.

The borders of the various aforementioned regions, as indicated in FIG. 20, are merely indicative.

Dashed line 10 denotes globally the position of an incision which can be formed in an advantageous embodiment of the method and system according to the invention. In this case, the initially still present parts of the skin of the regio colli ventralis A, D (including at least a part of the skin in the crop region F), the regio colli lateralis C, the dorsum anterius colli B and the dorsum posterius colli E are cut loose from the carcass part. The skin in the regio interscapularis H remains wholly or at least for the most part on the carcass part.

In an advantageous variant, all the skin is removed from the crop region.

In other species of poultry which are used on a large scale for human consumption, the anatomy of the neck region has in many cases broadly the same appearance.

Various embodiments and variants of the system according to the invention have been described hereinbefore. It will be clear to a person skilled in the art that these embodiments and variants, and also separate aspects thereof, may be combined with one another.

The invention claimed is:

1. System for cleaning a carcass or carcass part of slaughtered poultry, which carcass or carcass part at least still comprises a part of the breast fillet and skin, which skin comprises at least a part of the breast skin, at least a part of the neck skin and at least a part of the skin in the region of transition between the breast skin and neck skin, wherein the breast skin which is present and the skin in the region of transition between the breast skin and neck skin rest at least partly against the muscular tissue of the breast fillet, from which carcass or carcass part the muscular tissue of the neck and the neck vertebrae are substantially removed, which system comprises a neck skin removing device, which neck skin removing device comprises:
   a gripper for engaging a part of the neck skin that is connected to the rest of the carcass or carcass part,
   a stretching station, which stretching station is configured to exert a force on the neck skin engaged by the gripper in such a way that the skin in the region of transition between the breast skin and neck skin is stretched and becomes detached from the muscular tissue of the breast fillet,
   a blade which is adapted to cut into or to cut through the stretched skin in the region of transition between the breast skin and neck skin while the neck skin in the stretching station is subjected to the force.

2. System according to claim 1, wherein the force in the stretching station of the neck skin removing device is exerted via the gripper.

3. System according to claim 1, wherein the stretching station of the neck skin removing device comprises two rotatable gripper rolls which are provided with a profile, which profile is preferably rectilinear or helical.

4. System according to claim 3, wherein the distance between gripper rolls is variable.

5. System according to claim 3, wherein the distance between grippcr rolls is variable.

6. System according to claim 3, wherein the profile is detachable from the gripper rolls.

7. System according to one of claim 1, wherein the gripper of the neck skin removing device comprises two jaw parts which are preferably movable with respect to each other.

8. System according to one of the prccoding claima claim 1, wherein the gripper of the neck skin removing device comprises a skewer or toothed plate which is provided with one or more points for piercing the neck skin.

9. System according to claim 1, wherein the system further comprises:
   one or more product carriers for carrying a carcass or carcass part to be processed,
   a conveying system for moving the product carrier in a direction of conveyance so that the carcasses or carcass parts to be processed are moved along a path,
wherein the neck skin removing device is arranged with respect to the path of the carcasses or carcass parts in such a way that a carcass or carcass part arranged on the product carrier can be processed through the system.

10. System according to claim 9, wherein the system further comprises a neck piece removing device for removing neck muscular tissue and neck vertebrae, which neck piece removing device is arranged upstream of the neck skin removing device along the path of the carcasses or carcass parts.

11. System according to claim 9, wherein the system further comprises a dressing device for eviscerating a carcass or carcass part of slaughtered poultry, in which system the dressing device is arranged upstream of the neck skin removing device along the path of the carcasses or carcass parts.

12. System according to claim 9, wherein the distance between the gripper and the product carrier is smaller on entry of a product into the stretching station than at the location of the blade.

13. System according to claim 9, wherein the vertical distance between the blade and product carrier is adjustable.

14. System according to claim 1, wherein the system also comprises a device for harvesting breast skin.

15. System according to claim 1, wherein the system also comprises a guide for supporting the carcass or carcass part to be processed counter to the force exerted by the stretching station.

16. System according to claim 1, wherein the blade is arranged outside the region within which the breast fillets of the processed carcasses or carcass parts move.

17. System according to claim 1, wherein the system comprises a plurality of grippers which are attached to an endless carrier.

18. System according to claim 17, wherein the pitch between successive grippers is in all cases the same.

19. System according to claim 9, wherein the grippcr can he moved by means of a drive along a gripper path, and the drive is configured to make the gripper move synchronously with the product carrier for at least part of the time.

20. System according to claim 17, wherein the system comprises a plurality of product carriers which are at a fixed mutual distance, the pitch between successive grippers being equal to the mutual distance of the product carriers.

21. System according to claim 20, wherein the grippers move over at least a part of their path at the same speed and in the same direction as the product carriers.

22. System according to claim 1, wherein the gripper has an open and closed position, and wherein a guide ensures or contributes to the opening and/or closing of the gripper.

23. System according to claim 1, wherein the gripper has an open and closed position, and wherein a spring causes or contributes to the opening and/or closing of the gripper.

24. System according to claim 1, wherein the neck skin removing device is accommodated in a carousel.

25. System according to claim 1, wherein the system further comprises a neck skin stretching device for making the neck skin hang freely with respect to the carcass or carcass part, which neck skin stretching device is placed upstream of the neck skin removing device, which neck skin stretching device preferably comprises one or more rolls and/or one or more scrapers for engaging the neck skin.

26. System according to claim 1, wherein the force which is exerted in the neck skin removing device on the neck skin is adjustable and/or alterable.

27. Method for cleaning a carcass or carcass part of slaughtered poultry, which carcass or carcass part at least still comprises a part of the breast fillet and skin, which skin comprises at least a part of the breast skin, at least a part of the neck skin and at least a part of the skin in the region of transition between the breast skin and neck skin, wherein the breast skin which is present and the skin in the region of transition between the breast skin and neck skin rest at least partly against the muscular tissue of the breast fillet, from which carcass or carcass part the muscular tissue of the neck and the neck vertebrae are substantially removed, which method includes the following steps:
- arranging the carcass or carcass part to be processed on a product carrier, which product carrier can move in a direction of conveyance along a path,
- using a gripper to engage a clinging part of the neck skin of the carcass or carcass part to be processed,
- exerting a force on the neck skin engaged by the gripper, in such a way that the skin in the region of transition between the breast skin and neck skin is stretched and becomes detached from the muscular tissue of the breast fillet,
- cutting into or cutting through the stretched skin in the region of transition between the breast skin and neck skin while the neck skin is subjected to the force,
- removing the neck skin from the carcass or carcass part.

28. Method according to claim 27, wherein the force is exerted by increasing the distance between the gripper and product carrier.

29. Method according to claim 27, wherein the method also includes the step of harvesting breast skin.

30. Method according to claim 27, wherein the skin in the region of transition between the breast skin and neck skin is pulled loose from the muscular tissue of the breast fillet sufficiently far that the muscular tissue of the breast fillet remains out of reach of the blade with which the skin in the region of transition between the breast skin and neck skin is cut through or cut into.

31. Method according to claim 27, wherein the neck skin is cut loose from the carcass or carcass part.

32. Method according to claim 27, wherein the neck skin is partly cut loose and partly torn loose from the carcass or carcass part.

33. Method according to claim 27, wherein the carcass or carcass part to be processed is a breast cap, front half or dressed carcass of slaughtered poultry.

34. Breast skin, harvested using the method according to claim 27.

35. Method according to claim 27, wherein the carcass or carcass part to be processed initially still comprises skin from one or more of the following anatomical regions:
- regio colli ventralis, anterior part,
- regio colli ventralis, posterior part,
- regio colli lateralis,
- dorsum anterius colli,
- dorsum posterius colli, and wherein this skin is removed from the carcass or carcass part during the carrying-out of the method, and wherein any skin present on the carcass or carcass part in the regio interscapularis is not removed.

36. Method according to claim 27, wherein the skin is removed from the crop region of the carcass or carcass part.

* * * * *